United States Patent [19]

Virdee

[11] Patent Number: 5,473,686
[45] Date of Patent: Dec. 5, 1995

[54] ECHO CANCELLATION APPARATUS

[75] Inventor: Harbhajan S. Virdee, Richardson, Tex.

[73] Assignee: Tandy Corporation, Forth Worth, Tex.

[21] Appl. No.: 190,775

[22] Filed: Feb. 1, 1994

[51] Int. Cl.$^6$ .................................................. H04M 9/00
[52] U.S. Cl. ...................... 379/410; 379/402; 379/411; 379/406; 379/412; 381/91; 381/94; 381/101; 381/103
[58] Field of Search .................... 379/410, 411, 379/412, 406, 407, 408, 402; 381/94, 91, 101, 103

[56] References Cited

U.S. PATENT DOCUMENTS

| | | | |
|---|---|---|---|
| 4,866,779 | 9/1989 | Kennedy et al. | 381/94 |
| 4,922,530 | 5/1990 | Kenney et al. | 379/411 |
| 4,965,834 | 10/1990 | Miller | 381/94 |
| 5,084,865 | 1/1992 | Koike | 379/410 |
| 5,351,291 | 9/1994 | Menez et al. | 379/410 |
| 5,371,789 | 12/1994 | Hirano | 379/410 |

OTHER PUBLICATIONS

Digital Signal Processing Applications With The TMS320 Family, vol. 1, Edited by Kun–Shan Lin, Ph.D., Digital Signal Processing Semiconductor Group Texas Instruments, pp. 417–454, 1986.

Adaptive Signal Processing, Prentice–Hall Signal Series, B. Widrow and S. D, Stearns, 1985, pp. 302–367.

*Primary Examiner*—Jeffery A. Hofsass
*Assistant Examiner*—Jacques M. Saint-Surin
*Attorney, Agent, or Firm*—Bookstein & Kudirka

[57] ABSTRACT

The length (or the number of taps) of an adaptive finite impulse response (AFIR) filter is continuously modified to produce optimal echo cancellation. In accordance with one illustrative embodiment, this modification is performed by increasing or decreasing the number of delayed samples which are used to generate an echo estimate. More specifically, the number of samples used to generate the echo estimate is determined by selecting a trial number of samples and operating the filter for a sufficient length of time to allow the tap weights in the filter to stabilize. The tap weights are then examined to determine whether the taps at the end on the filter contribute at least a first threshold amount to the echo estimate. If not, the number of samples used in the filter is reduced and the process repeated. If the taps at the end of the filter contribute more than a second threshold amount, the number of samples is increased and the process is repeated.

40 Claims, 9 Drawing Sheets

5,473,686

ECHO CANCELLATION APPARATUS

FIELD OF THE INVENTION

This in elates generally to speakerphones and, in particular, to speakerphones which operate in the full duplex mode of operation.

BACKGROUND OF THE INVENTION

One of the most popular pieces of telephone equipment presently on the market is the speakerphone, a device which allows "handsfree" operation by utilizing a microphone and a loudspeaker to receive and transmit voice information or other sounds. Although speakerphones have been in existence for many years, they typically suffer from certain drawbacks which often make their use difficult or inconvenient. More particularly, because its microphone and loudspeaker are located in close physical proximity (often together in a small unit), the speakerphone is highly susceptible to interference from echoes caused by sounds generated by the loudspeaker and received by the nearby microphone and other noise generated by both acoustic and electrical sources. In addition, speakerphone systems are susceptible to electrical echoes. An electrical echo is generated when a portion of the electrical signal which represents the acoustical information is "reflected" as the signal travels along the electrical circuit and the reflected portion of the signal travels back to its source.

Acoustic echoes occur because sounds generated by the loudspeaker are detected by the microphone and transmitted back over the telephone line. The sounds generated by the speaker reach the microphone either directly or by reflections from the walls of the room in which the phone is located. One method of eliminating acoustic echoes is to utilize a "half-duplex" system in which either the speaker or the microphone is active, but both devices are not active at the same time. In such an arrangement, a circuit monitors the microphone output and turns off the speaker for a predetermined period of time when the microphone has detected a sound. Similarly, if the speaker is active, the microphone is disabled for a predetermined period of time.

Half duplex systems suffer from a problem that only one person of a two-person conversation can speak at any given time and, even then, the first syllable or two of speech is often "clipped" or lost due to the "dead" time interval that occurs when the microphone switches from the inactive state to the active state. When a half-duplex speakerphone is connected to a conventional handset phone, the clipping problem is acceptable, but when two such speakerphones are connected together, it is often very difficult to converse without losing a significant amount of information. In order to overcome the problems associated with half-duplex speakerphones, "full-duplex" speakerphones have been used in which both the microphone and the speaker are operational at all times, but such systems are extremely susceptible to acoustic echoes.

FIG. 1 is a schematic block diagram which illustrates how both acoustic and electrical echoes are generated in a speakerphone system. In particular, FIG. 1 shows a schematic representation of a full-duplex speakerphone consisting of a speaker 104 and a microphone 120 connected to telephone circuitry 106. The speaker 104 and the microphone 120 are located in a room 102 and the telephone circuit 106 is, in turn, connected by means of a two- wire receiving leg 108 and a two-wire transmitting leg 122 to a hybrid circuit 124. The hybrid circuit 124 converts the four-wire circuit, comprising legs 108 and 122, to a two-wire line 125. At the other end of the telephone line, a similar hybrid circuit 114 converts the two-wire line 125 back into a four-wire circuit comprising a receiving leg 112 and a transmitting leg 128.

An acoustic echo is generated when a sound emanating from the speaker 104 is transmitted into the microphone 120 (for example, by reflection from the room walls 103) and is heard by the person at the other end of the phone line 125. Since there are typically a variety of paths by which a sound generated by speaker 104 can reach microphone 120, many acoustic echoes can be generated from the same initial sound. Three such echo paths (paths 100, 116 and 118) are illustrated in FIG. 1. The echoes are annoying to the person at the far end.

As previously mentioned, an electrical echo is generated in the speakerphone system when a portion of the electrical signal transmitted from the near end is reflected back by impedance discontinuities in the electrical circuit and the reflected portion of the signal travels back to its source.

Acoustic and electrical echoes are particularly annoying when two persons are conversing over speakerphones because the echoes from a previously uttered phrase often arrive as a person has begun speaking a new phrase. Consequently, in most speakerphone systems, and, in particular, full-duplex speakerphone systems, adaptive filters are used to reduce the echoes to an acceptable level.

Specifically, at the near end, the signal reaching the loudspeaker is also applied to an adaptive filter whose output is subtracted from the electrical output of the microphone. The filter is adjusted automatically to provide a transfer function close to identical with that of the path through the loudspeaker and microphone by way of the acoustical coupling between those components. The subtractive process thus eliminates, or greatly reduces, the acoustic feedback signal in the microphone output. The same arrangement is used to cancel electrical echoes by applying the electrical signal generated by the microphone to a second adaptive filter whose output is subtracted from the signal going out to the loudspeaker. A typical adaptive filter used in speakerphone systems is called an adaptive finite-impulse-response (AFIR) filter which is comprised of a tapped delay line that generates signals that are selectively combined to generate the filter output.

FIG. 2 shows the telephone circuitry in an illustrative speakerphone (corresponding to a portion of circuitry 106 in FIG. 1) in which two digital AFIR filters are used as echo cancelers to cancel both acoustic and electrical echoes. In the illustrated circuit, AFIR filter 212 is used as an acoustic echo canceler and AFIR filter 216 is used as an electrical echo canceler. The microphone input 200 is provided to an analog-to-digital converter 202 where it is sampled at the Nyquist rate to generate a plurality of digital samples over time. These samples are provided to a summer 204 where the correction signal output 213 of the AFIR filter 212 is subtracted to generate the echo-corrected signal. This latter signal is provided over bus 206 to digital-to-analog converter 210 and reconverted back to analog form for transmission over the telephone lines attached to line output 208. An error signal, derived from the corrected signal, is also fed back to the AFIR filter 212, via bus 214, in order to adaptively adjust the filter coefficients in a known manner to cause the filter to adapt to changes in the echo generating mechanisms as discussed above.

In a similar manner, signals received at the line input 230 are provided to an analog-to-digital converter 228 for conversion into digital form. The digital signals are, in turn, provided to a summer 226 which subtracts the correction signals generated by electrical echo corrector filter 216. The digital output samples (for line and speaker) are converted to analog signals using digital-to-analog converter 222. The corrected signal is also fed back to AFIR filter 216 via bus 218 in order to adaptively adjust the filter coefficients as explained above for AFIR filter 212.

More specifically, a typical finite-impulse-response (FIR)filter is a linear filter, preferably in the form of a tapped delay line. Each tap has associated with it a "weight" which modifies the characteristic of the filter. If the delay line has only feed-forward delays, its transfer function can be expressed as a single polynomial in $Z^{-1}$ and the filter's impulse response is limited to a finite number of points; therefore, it has a finite impulse response.

An adaptive finite impulse response (AFIR) filter is an FIR filter with provision for automatic adjustment of its tap weights. FIG. 3 shows an AFIR filter with a least-mean-squared (LMS) algorithm used for adapting the tap weights which filter is used, in this example, as an echo canceler. A plurality of received digital signal samples, A(k), which are typically samples derived from an analog signal sampled at, or above, the Nyquist rate, is introduced to the filter at the input 310. This signal is used as a reference signal to develop an estimate of the echo to be canceled and the signal is applied to successive delay units 300, 302, etc. until the "end" of the filter at delay unit 308 is reached.

Each of the delays: 300, 302, 304, 306, 308 and any additional (but not illustrated) delays, produces a delayed version of the signal which is provided to it and the delayed signal version is passed on to the next delay unit. The delayed versions of the signal (illustrated as signals $A_1$-$A_N$) are also fed to multipliers 312, 314, 316, 318, through 320 where they are multiplied by associated tap weights C1, C2, C3, C4, through $C_N$. The multiplier outputs are fed into summer 322 where they are added to produce, in the case of an echo cancellation application, the filter output which is an estimate of the echo.

The echo estimate, S(k), is subtracted from the signal R(k), which is the desired (echo-free) signal corrupted by the echo, by adder 330. The output of adder 330, E(k), is used as an estimate of the desired signal 326 and comprises the actual desired signal plus whatever residual error exists between the estimate of the echo S(k), and the actual echo signal.

The desired signal estimate E(k) is also used to modify the tap weights, that is, adapt the FIR filter, generally by means of an algorithm as shown at 328. The particular algorithm illustrated in box 328 is a least mean squares (LMS) algorithm which computes the tap weight for a given sample ($C_i(k+1)$) using the tap weight used with the previous sample ($C_i(k)$) plus a correction factor which consists of a product of a convergence constant ($\beta$), the delayed signal from the previous sample ($A_i(k)$) and the estimated signal from the previous sample time (E(k)). This adaptation reduces the signal error attributable to echoes and adjusts to changing conditions which modify the echo characteristics.

FIG. 4 shows an illustrative flow chad for operating an AFIR filter such as that shown in FIG. 3. The process begins at step 400 and proceeds to step 402 where the next sample, corresponding to a sampled version of a reference signal 310 of FIG. 3, is retrieved. Then an echo estimate is generated at step 404 using an FIR filter. An input sample, corresponding to the desired output sample plus an echo contribution is then retrieved at step 406. The estimated output is calculated at step 408 and is used at step 410 to update the tap weights ($C_n$) associated with the AFIR. At step 412, the echo-canceled signal, E(t), is output. At this point, the routine is complete, as illustrated by step 414.

AFIR filters can be used as illustrated in FIGS. 2 and 3 to reduce both acoustic and electrical echoes in speakerphones, however, such filters cannot be designed to optimize echo reduction in every environment. In particular, in prior art designs, the length, or the number of taps in the AFIR filter is fixed by the circuit designer and this length directly affects the capacity of the filter to cancel echoes in selected environments.

For example, in environments where long-delayed echoes are present, a filter with a long delay line or many taps produces optimal echo reduction since it may be necessary to delay the reference signal by a long time delay in order to generate an accurate echo estimate. On the other hand, when a filter with a long delay line is used in environments where the echo delay time is shod, the taps at the end on the delay line contribute very little to the echo estimate and increase quantization noise in the output. Consequently, a circuit which is to operate in many different environments must necessarily be a compromise design and, therefore, may not be optimal in any given environment or in environments which change over time.

Accordingly, it is an object of the present invention to provide echo cancellation circuits which improve echo cancellation over prior art echo cancellation circuits.

It is another object of the present invention to provide echo cancellation circuits which automatically adjust the length of the AFIR filter delay line in order to cancel echoes optimally in most environments.

SUMMARY OF THE INVENTION

The foregoing problems are solved and the foregoing objects are achieved in one illustrative embodiment of the invention in which the length (or the number of taps) of an adaptive finite impulse response (AFIR) filter is continuously modified to produce optimal echo cancellation.

In accordance with one illustrative embodiment, this modification is performed by increasing or decreasing the number of delayed samples which are used to generate the echo estimate. More specifically, the number of samples used to generate the echo estimate is determined by selecting a trial number of samples and operating the filter for a sufficient length of time to allow the tap weights in the filter to stabilize. The tap weights are then examined to determine whether the taps at the end on the filter contribute at least a first threshold amount to the echo estimate. If not, the number of samples used in the filter is reduced and the process repeated. If the taps at the end of the filter contribute more than a second threshold amount, the number of samples is increased and the process is repeated.

Adding or subtracting delayed signals (or taps) at the end of the filter can be used to minimize both electrical and acoustic echoes under changing conditions. Additional advantages include a reduction in quantization errors in the output as only the necessary filter terms are summed in the filtering algorithm to generate the echo estimate.

Further, in accordance with another embodiment, a reduction in storage requirements for the data samples and the coefficients can be achieved by means of dynamic memory allocation. As the number of filter samples used in the calculations is reduced, thereby reducing the memory allocated to store the samples and coefficients, the unallocated memory can be used for other purposes. For example, in a system which uses two or more filters, the length of one filter can be extended as the length of another filter is reduced. This shifting of memory resources between filters makes it possible to reduce the overall memory requirements and leads to a more economical implementation.

In yet another embodiment, filter-length adaptation is performed by a controller which determines when, and in what direction, the filter length should be modified. The controller may be implemented along with filter itself and other signal processing functions by a digital signal processing chip (integrated circuit). Further, if a digital signal processing chip is employed to produce the filtering functions, both acoustic and electrical echo cancellation may be accomplished on a single chip, thereby providing additional performance and cost advantages.

BRIEF DESCRIPTION OF THE DRAWINGS

For a fuller understanding of the nature of the invention, reference should be made to the following detailed description taken in connection with the accompanying drawings, in which.

DETAILED DESCRIPTION OF THE PREFERRED EMBODIMENT

Figure 5:
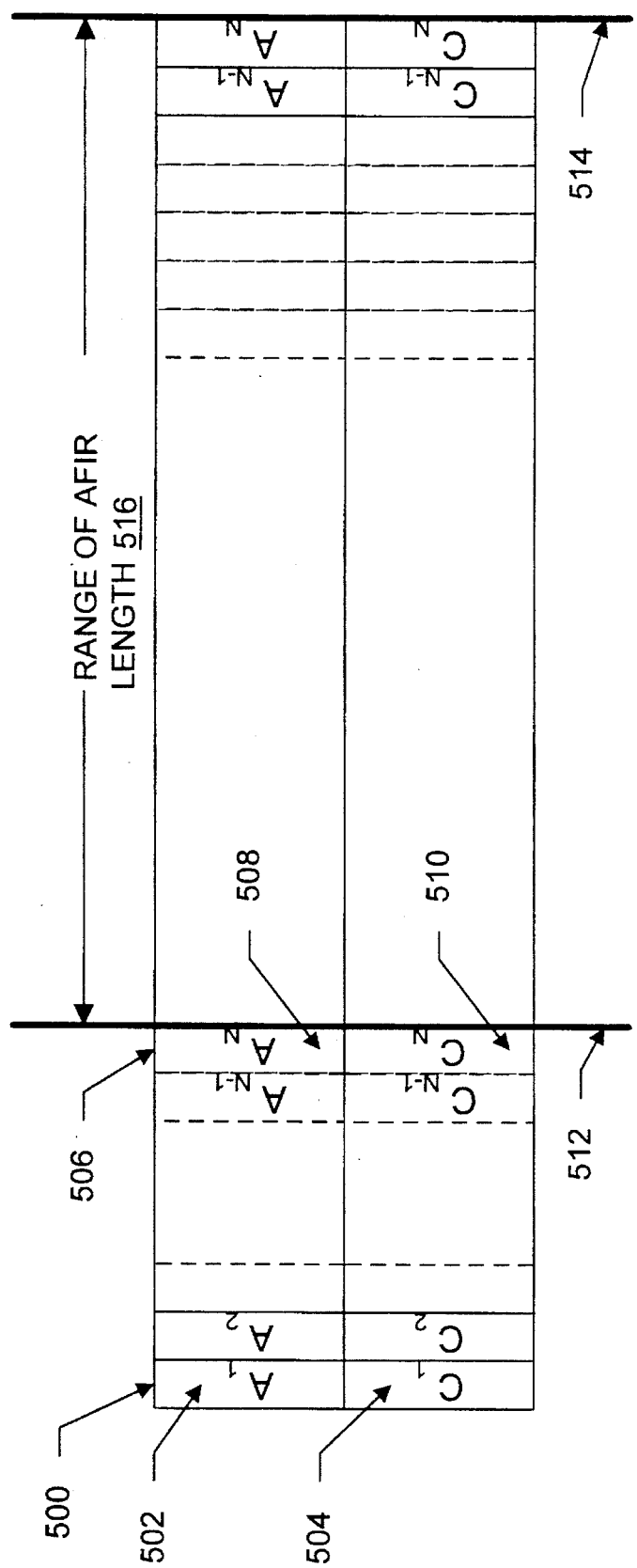
FIG. 5 is a diagram which illustrates the range of allocation of memory locations to received signal reference samples, $A_1$-$A_N$, and filter coefficient weights, $C_1$-$C_N$, in an adaptive length adaptive finite-impulse-response (ALAFIR) filter.

The basic concept of an ALAFIR is illustrated in FIG. 5 where $C_1$-$C_N$ and $A_1$-$A_N$ represent the tap weights and delayed data samples, respectively, of an AFIR. FIG. 5 illustrates a portion of a memory in which the various samples and coefficients are stored. Each tap in the filter requires data storage for two data words: one word represents the delayed signal value and the other word represents the tap coefficient, or weighting, value. For example, the first filter tap 500 is represented by delayed sample value $A_1$ (502) and tap coefficient value $C_1$ (504). The last filter tap 506 is represented by delayed sample value $A_N$ (508) and tap coefficient value $C_N$ (510).

As the filter is lengthened or shortened, the number of taps and, therefore, the number of tap weights, $C_N$, and delayed samples, $A_N$, which must be stored varies accordingly between a minimum number 512 to a maximum number 514. The minimum number of taps, represented by line 512, is that number which satisfies the minimal filter performance criteria. The maximum filter length, represented by line 514, is generally limited by the size of the memory. In accordance with the principles of the present invention, and as will be discussed in detail below, a length adapting process automatically adjusts the filter length to optimize filter performance.

Figure 6:
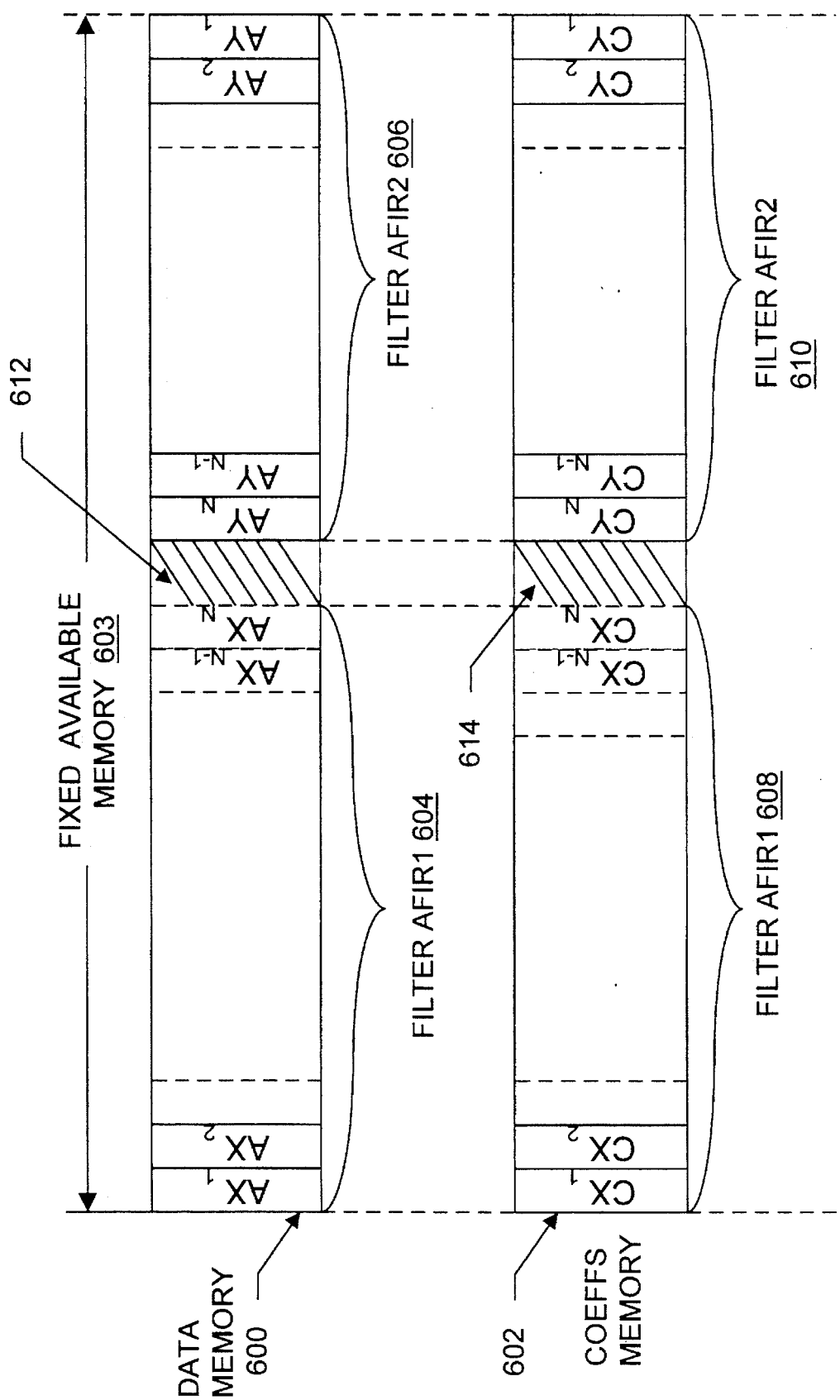
FIG. 6 is a diagram which shows an illustrative arrangement of memory in a system which employs two ALAFIR filters implemented in accordance with the principles of the invention.

FIG. 6 shows an illustrative memory-allocation scheme for a system which uses two ALAFIRs. A data memory portion 600 is provided for storing the delayed samples and a separate memory portion 602 is provided for storing the tap coefficient values. Each of memory portions 600 and 602 illustratively have the same fixed memory length 603. Each of memory portions 600 and 602 is further divided into two segments with one segment corresponding to each of the two filters. For example data memory portion 600 is divided into a segment 604 for filter AFIR1 which stores the delayed data values $AX_1$-$AX_N$ and a segment 606 for a second filter AFIR2 which stores the delayed data values $AY_1$-$AY_N$. The memory segments are separated by a "buffer" space 612.

It should be noted that as filter AFIR1 becomes longer and the number of stored data samples increases, the additional stored samples are added starting at the beginning of the filter (the "left" end of memory segment 604) and increasing towards buffer space 612 (the filter "grows" to the right hand side of segment 604). In the same manner, as filter AFIR2 increases in length, the additional stored samples are added starting at the beginning of memory segment 606 (the "right" end of segment 606) and increasing towards the end of the filter next to the buffer space 612 (towards the "left" of memory segment 606).

In the same manner, the coefficient memory portion 602 is divided into a segment 608 for filter AFIR1 which stores the tap coefficient values $CX_1$-$CX_N$ and a segment 610 for a second filter AFIR2 which stores the tap coefficient values $CY_1$-$CY_N$. The latter two memory segments are separated by a "buffer" space 614.

As filter AFIR1 becomes longer and the number of stored coefficient values increases, the additional stored values are added starting at the beginning of the filter (the "left" end of memory segment 608) and increasing towards buffer space 614 (the filter "grows" to the right hand side of segment 608). In the same manner, as filter AFIR2 increases in length, the additional stored values are added starting at the beginning of memory segment 610 (the "right" end of segment 610) and increasing towards the end of the filter next to the buffer space 614 (towards the "left" of memory segment 610).

In accordance with the principles of the invention, the memory portions 600 and 602 are dynamically allocated between the filters AFIR1 and AFIR2; the memory "freed up" by one filter may be used by the other (all of the allocated memory elements are "zeroed" after they are released from one filter and before they are assigned to the other filter).

The lengths of the filters may be adapted dependently or independently however, in general, both the data memory segment and the corresponding coefficient memory segment are the same length for a given filter (for example, filter AFIR1 data memory segment 604 has the same length as filter AFIR1 coefficient memory segment 608). If the lengths are adapted dependently, an increase in the length of one filter (for example, filter AFIR1) automatically brings about a corresponding decrease in the length of the other filter (filter AFIR2), therefore, buffer spaces 612 and 614 may comprise a fixed number of memory locations. Alternatively, if the filter lengths are adapted independently, the size of buffer spaces 612 and 614 may be increased to a maximum size or decreased to a minimum size in order to accommodate the changes in combined length of the filters.

Filter length is changed by examining the coefficient values at the end of the filter (the "trailing" coefficients) and using the coefficient values to make a determination that the coefficient values are small and, thus, the trailing taps are not making a significant contribution to the output, in which case the filter length can be decreased. Alternatively, the coefficient values may be large indicating that delayed signal values have been discarded because the filter is too short, in which case the filter length in increased.

The examination of the trailing coefficient values and the decision as to whether the trailing taps are contributing too much or too little to the echo estimate may be based on a variety of criteria. For example, the examination may be based on the RMS value of the trailing coefficients or coefficient "energy" changes, or the sum of the coefficient absolute values. In addition, the length adjustment process of an ALAFIR may also take into account the return loss enhancement of the filter by adjusting the filter length to provide the same echo return loss enhancement (ERLE) as a comparable AFIR. According to conventional definitions the ERLE of a particular filter is given by:

$$ERLE(dB) = 10\log_{10}\left[\frac{E[y(k)^2]}{E[e(k)^2]}\right]$$

where $E[y(k)^2]$=average power of the returned signal, and $E[e(k)^2]$=average power of the uncanceled echo signal.

If length adjustment is performed on this basis, the ALAFIR will provide the same ERLE as the comparable AFIR while reducing the quantization error. The ALAFIR will exhibit lower quantization error because an ALAFIR will require fewer taps to provide the same ERLE as the comparable AFIR.

For example, the RMS value of the trailing coefficients can be used for filter length adaptation. More particularly, a predetermined number C"X") of the trailing coefficients are selected for examination. The RMS value of these "X" coefficients is computed and this value is compared to predetermined upper and lower thresholds. Illustratively, the upper and lower thresholds may be based on the RMS value of all the filter coefficient values. The filter is lengthened if the RMS value of the last "X" coefficients exceed the upper threshold and the filter length is shortened if the RMS value of the last "X" coefficients is less than the lower threshold. The RMS value of the last "X" coefficients ($RMS_X$) may be computed according to the following equation:

$$RMS_X = \left(\frac{\sum_{i=N-X}^{N} C_i^2}{X}\right)^{1/2}$$

where the number of examined coefficient values X may be chosen according to either arbitrary or empirical criteria. Illustratively, the number of examined coefficient values ranges between 10 and N/20.

In another exemplary embodiment, the filters length may be adjusted in response to the coefficients "energy" change. This method entails computing a running average, $E_N$, of the energy of all coefficients according to the equation:

$$E_N = \frac{\sum_{i=1}^{N} C_i^2}{N}$$

The energy content of the last "X" coefficients, $E_x$, is then calculated by:

$$E_X = \frac{\sum_{i=N-X}^{N} C_i^2}{X}$$

If the energy $E_x$ is, for example, less than 5% of total energy $E_N$, then the last "X" taps are not needed and the filter is shortened by X taps. However, if, for example, $E_x$ is greater than 10% of total energy $E_N$, the filter is lengthened by X taps. In another exemplary embodiment, the filter length is adapted according to the coefficients' absolute values. The average absolute value of the last "X" coefficients ($A_x$) is computed and compared to the average absolute value of all the coefficients ($A_N$):

$$A_N = \frac{\sum_{i=1}^{N} |C_i|}{N}$$

$$A_X = \frac{\sum_{i=N-X}^{N} |C_i|}{X}$$

Filter length adjustment is then made according to the following criteria:

if $A_x \leq A_N/20$ then decrease filter length
if $A_x \geq A_N/10$ then increase filter length where the predetermined thresholds 20 and 10 are chosen either arbitrarily or empirically.

However, regardless of which criterion is chosen, filter length is adjusted only after a time delay from a prior length adjustment. This adjustment delay, designated $T_A$, allows sufficient time for the filter coefficients to converge and stabilize at their optimum values. In general, the adjustment delay is proportional to the length (total number of taps, N) of the AFIR and inversely proportional to $\beta$, the convergence constant for the tap weights and may be determined by the following relationship:

$T_A = k \cdot N/\beta$ where k is an adjustment constant.

Figure 7:
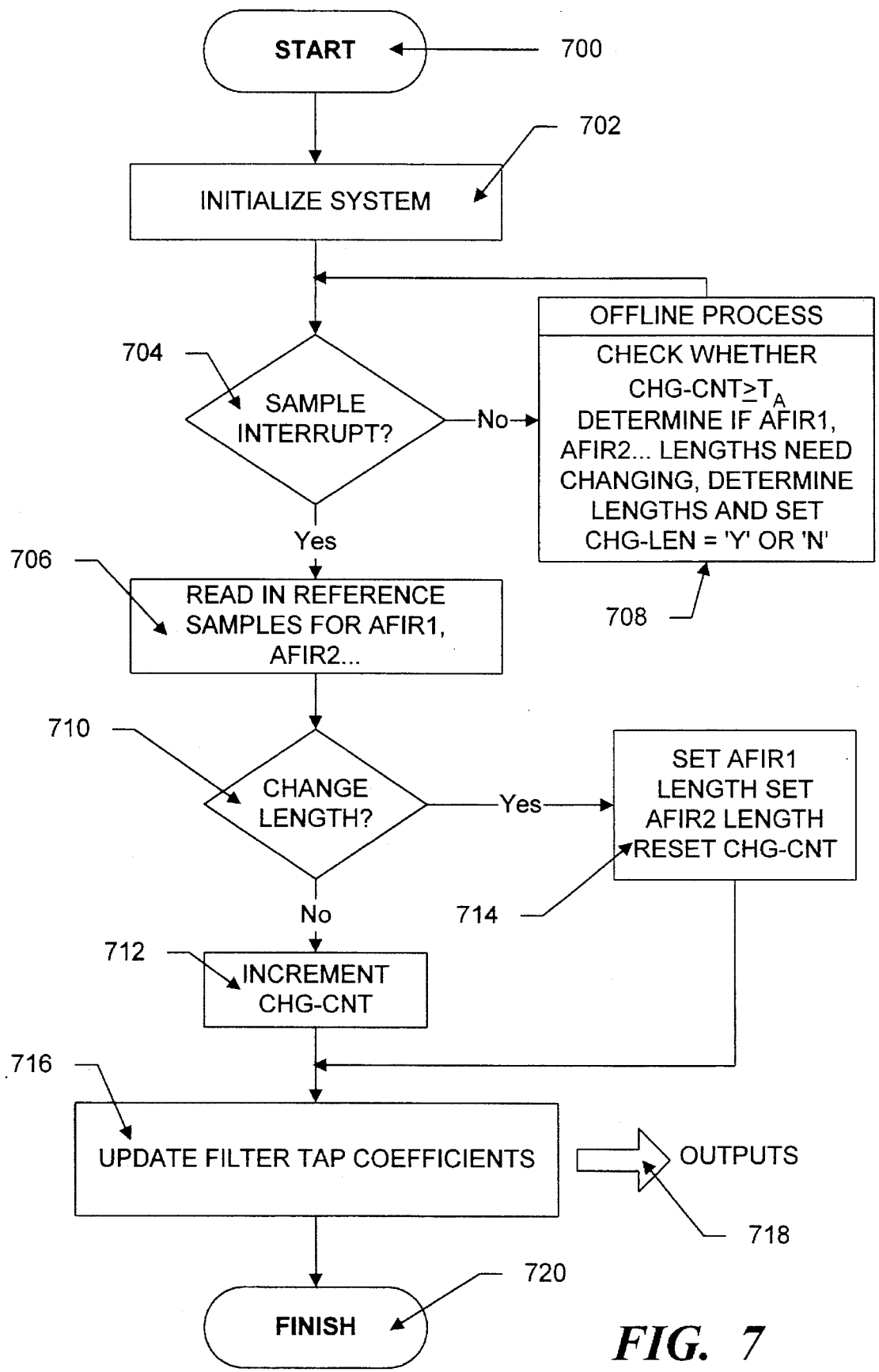
FIG. 7 is a flow chad which sets forth the sequence of steps employed by a two filter ALAFIR echo canceler.

The flow chart of FIG. 7 illustrates an exemplary implementation of a two-filter ALAFIR wherein the lengths of both filters, AFIR1 and AFIR2, are automatically adjusted.

The implementation begins at step 700 and proceeds to step 702 where the system is initialized. The initialization may involve, for example, clearing or zeroing all memory spaces for the data samples and the coefficient segment for both filters and clearing all computation variables.

At step 704, an interrupt flag is checked to determine whether new reference input samples, $AX_i$ and $AY_i$, have been received for each of the filters AFIR1 and AFIR2. If no reference samples have been received, no interrupt flag is set and the filter proceeds to an off-line process illustrated by step 708. In this off-line process, as will hereinafter be discussed in detail, the routine determines whether the lengths of the filters AFIR1 and AFIR2 should be adjusted, and, if so, a Chg-Len flag is set. As previously mentioned, this determination is made only after a delay $T_A$ from the previous filter length adjustment. Consequently, before checking the filter lengths, the routine checks to see whether the time interval from the last filter adjustment equals or exceeds the predetermined time delay, $T_A$. This latter determination is made by comparing a variable Chg-Cnt to the predetermined delay number $T_A$. The Chg-Cnt variable is incremented as discussed below and determines when the filter length will be changed. The program continues to loop through this off-line process until new reference samples, $AX_i$ and $AY_i$, are received and detected at step 704 by an examination of an interrupt flag.

When new reference samples are detected at step 704, the routine proceeds to step 706 where new reference input samples, $AX_i$ and $AY_i$, for filters AFIR1 and AFIR2 are read into the next available memory locations. Then, at step 710, the Chg-Len flag, which may have been set in step 708, is tested to determine whether the filter lengths should be adjusted and, if so, in step 714, they are adjusted to the lengths determined in the off-line process of step 708 and the Chg-Cnt variable is reset to zero thereby starting a new time interval between length adjustments.

Figure 1:
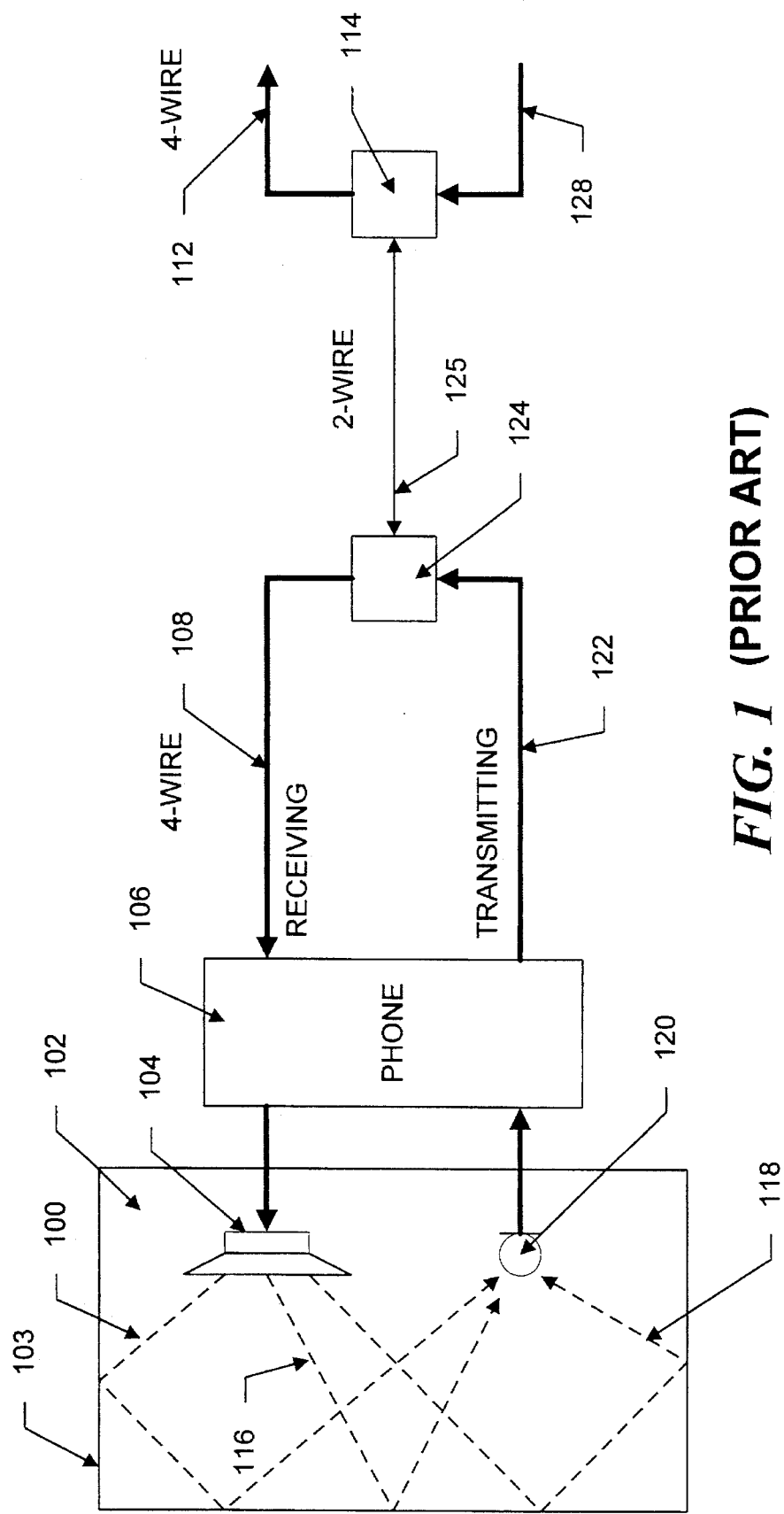
FIG. 1 is a block diagram of a prior art speaker phone system.
Figure 2:
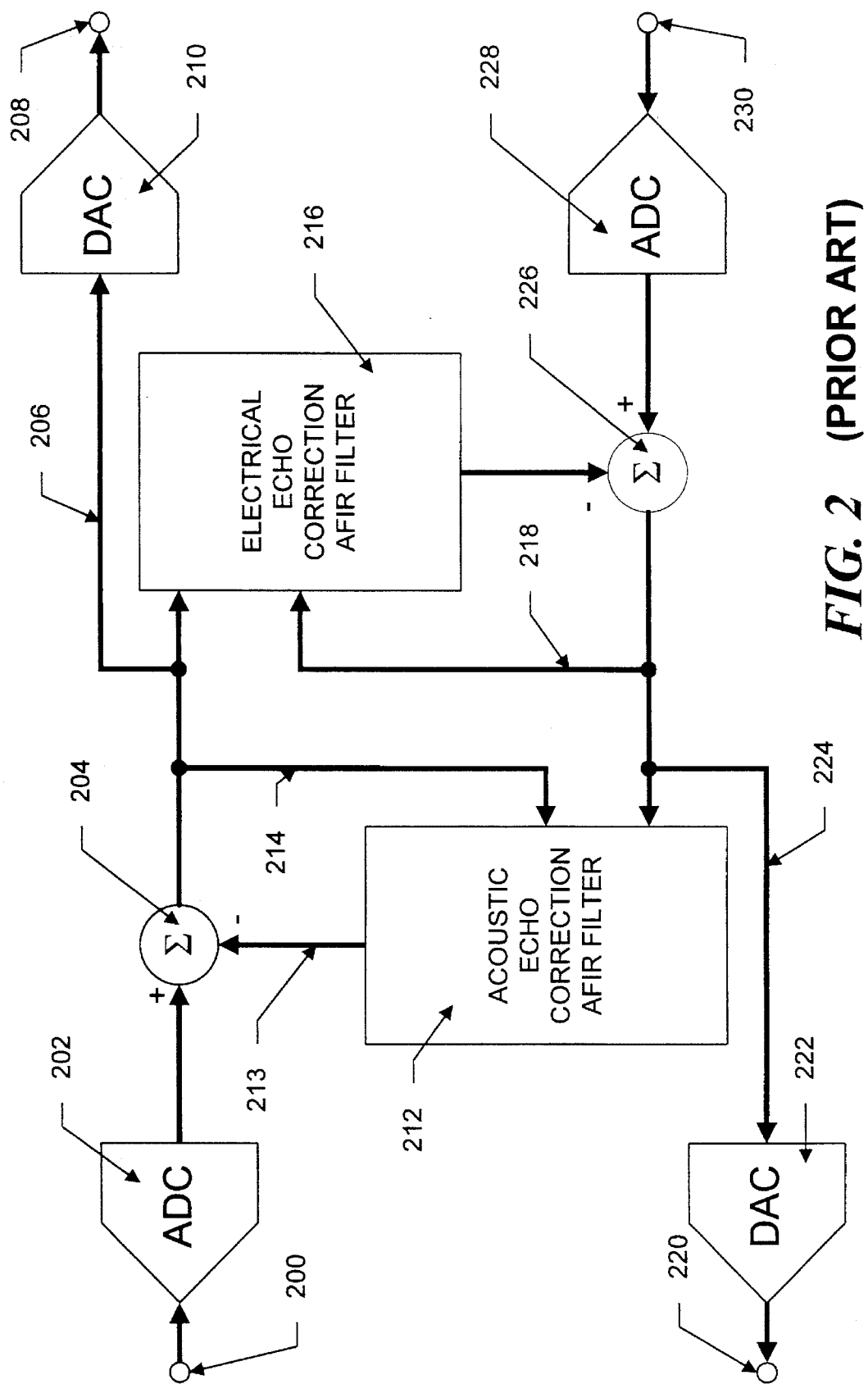
FIG. 2 is a block diagram of a portion of a prior art phone circuit illustrating the use of AFIR filters for acoustic and electrical echo cancelers.
Figure 3:
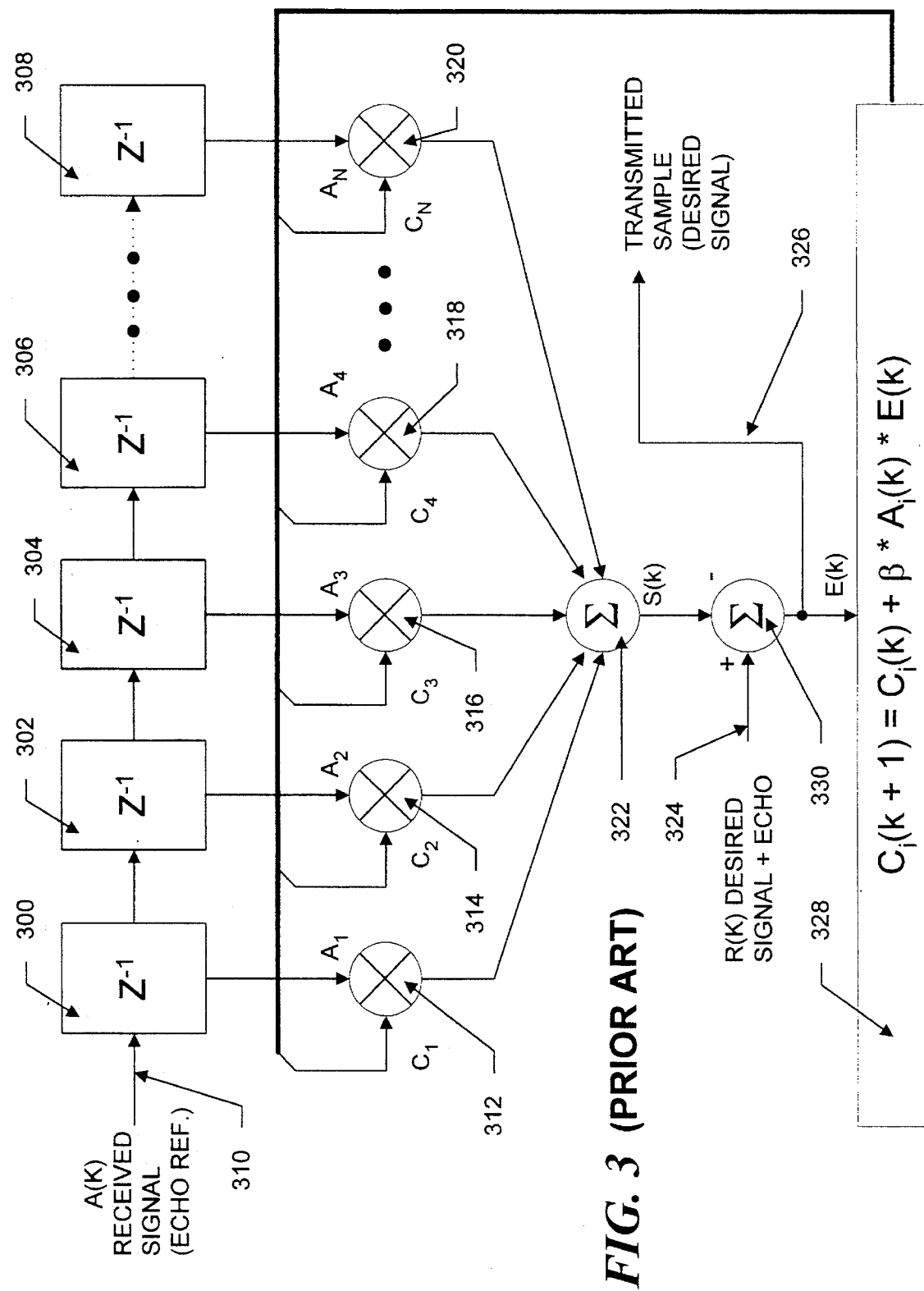
FIG. 3 is a more detailed block diagram of a prior art adaptive finite impulse response filter (AFIR)illustrating the tapped delay line construction.
Figure 4:
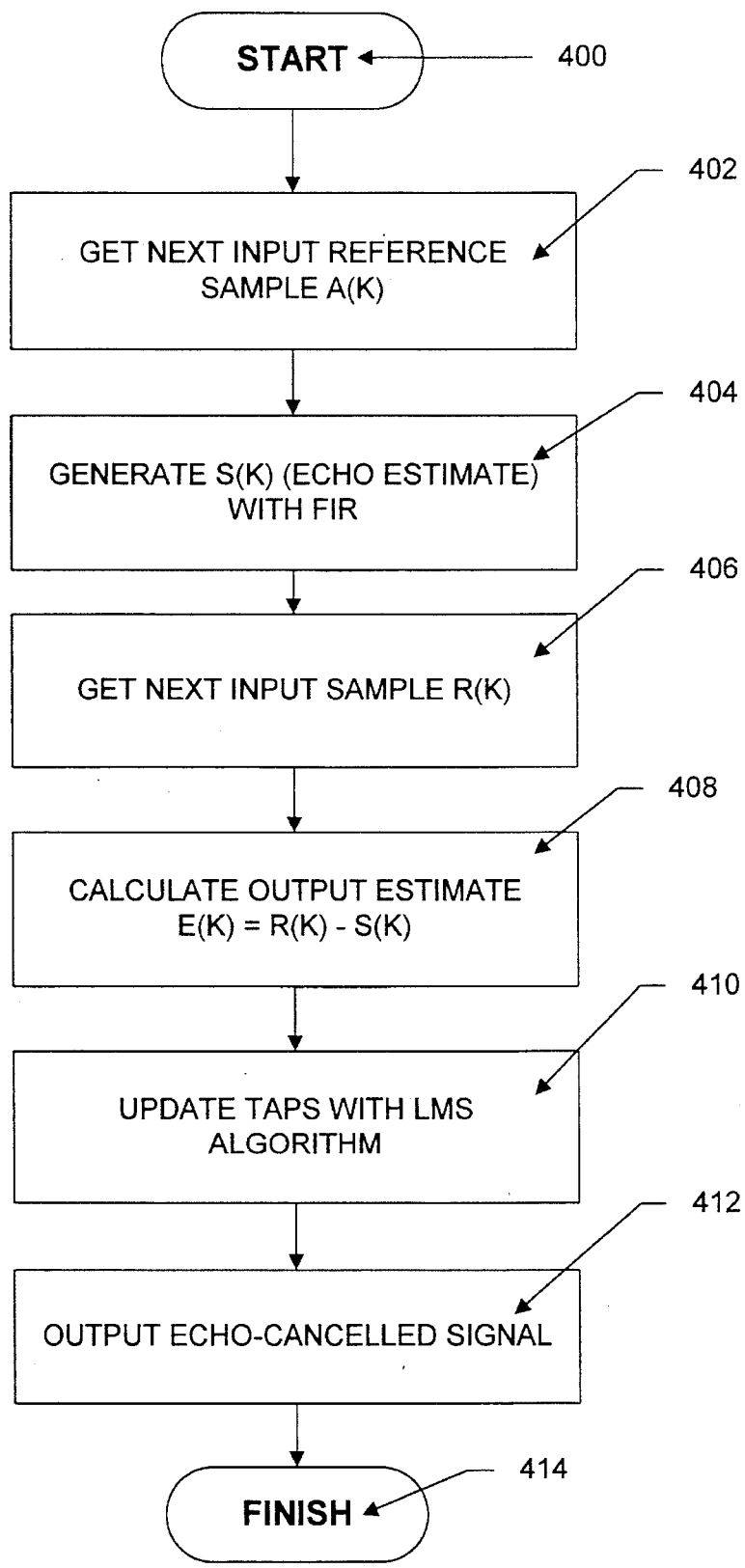
FIG. 4 is a flow chart which sets forth the operation of an adaptive process used to update the filter coefficients of a prior art AFIR.

If no change in length is called for (the Chg-Len flag is not set), the routine proceeds to step 712 where the Chg-Cnt variable that indicates the interval of time since a previous filter length adjustment, is incremented. From there the routine proceeds to step 716, where filter tap weights are adapted (for example, using the routine illustrated in FIG. 4) and, at step 718, echo-canceled samples are output in accordance with step 412 as set forth in FIG. 4. The process is then complete, as indicated at step 720.

Figure 8:
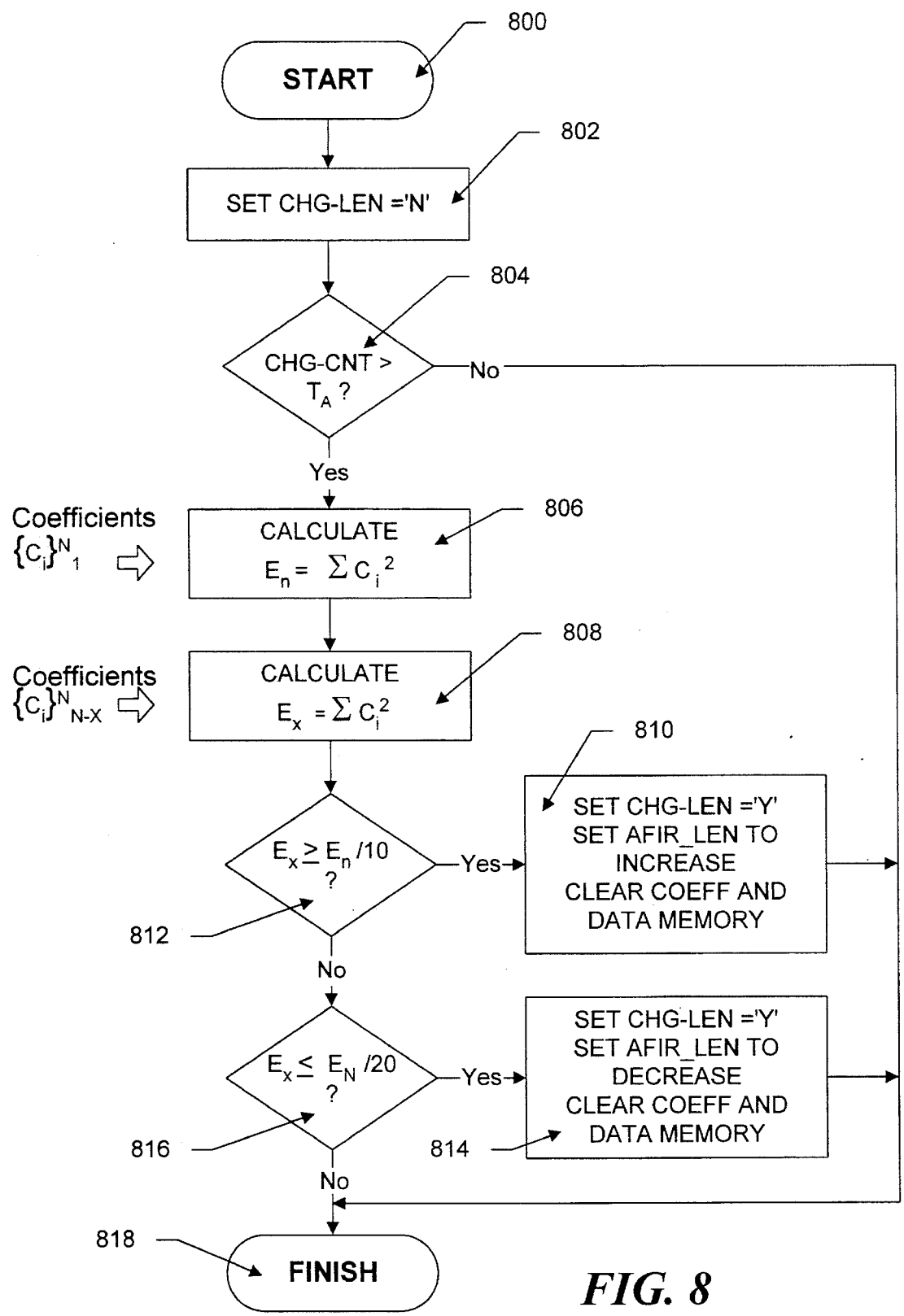
FIG. 8 is a flow chart which shows an illustrative method of determining whether the length of an ALAFIR filter should be changed in accordance with one embodiment of the present invention.

In this exemplary embodiment, most of the code needed to adapt the lengths of the ALAFIR filters executes in the time between incoming data samples and, in that sense, it is "off-line". FIG. 8 illustrates, in detail, an exemplary embodiment of off-line code which employs the aforementioned coefficient energy criterion to adapt the length of a single AFIR filter. The length determination process begins at step 800 and proceeds to step 802 where the Chg-Len flag, is initialized to indicate that the length of the filter should not be changed.

Next, at step 804, the variable Chg-Cnt is compared to the predetermined adjustment delay T A to determine whether the filter coefficients have had sufficient time since the last length change to converge to their steady-state values. If insufficient time has elapsed, the program proceeds to finish in step 818.

If, on the other hand, sufficient time has elapsed since the last length adjustment, the energy content of all the coefficients, $E_N$, is computed in step 806 by summing the squares of all tap coefficient values for tap coefficients $C_1$ to $C_N$. In step 808, the energy content of the last "X" coefficients, $E_x$, is computed by summing the squares of tap coefficient values for tap coefficients $C_{N-X}$ to $C_N$. $E_x$ and $E_N$ are then compared in step 812. If the energy content of the trailing coefficients, $E_x$, is greater than 10% of $E_N$, then, at step 810, Chg-Len is modified to indicate that the filter length should be changed. The new length of the filter may also be determined at this point. In accordance with one embodiment, the new length would be the original length increased by X taps. The coefficient and data memory segments for the filter are then cleared in preparation for a change in filter length which actually set in step 714 (discussed previously). After this step, the routine proceeds to finish in step 818.

Alternatively, if the energy content of the trailing coefficients, $E_x$, is less than 10% of $E_N$, the program proceeds to step 816 where it determines whether $E_x$ is less than 5% of $E_N$. If so, the routine proceeds to step 814 where the Chg-Len flag is set to indicate that the filter length should be changed and the filter length is set (to a negative number) to cause a decrease in filter length. The coefficient and data memory segments for the filter are again cleared in preparation for a change in filter length. After this, the routine proceeds, as it would if $E_x$ were greater than 5% of $E_N$, to the finish, step 818.

Figure 9:
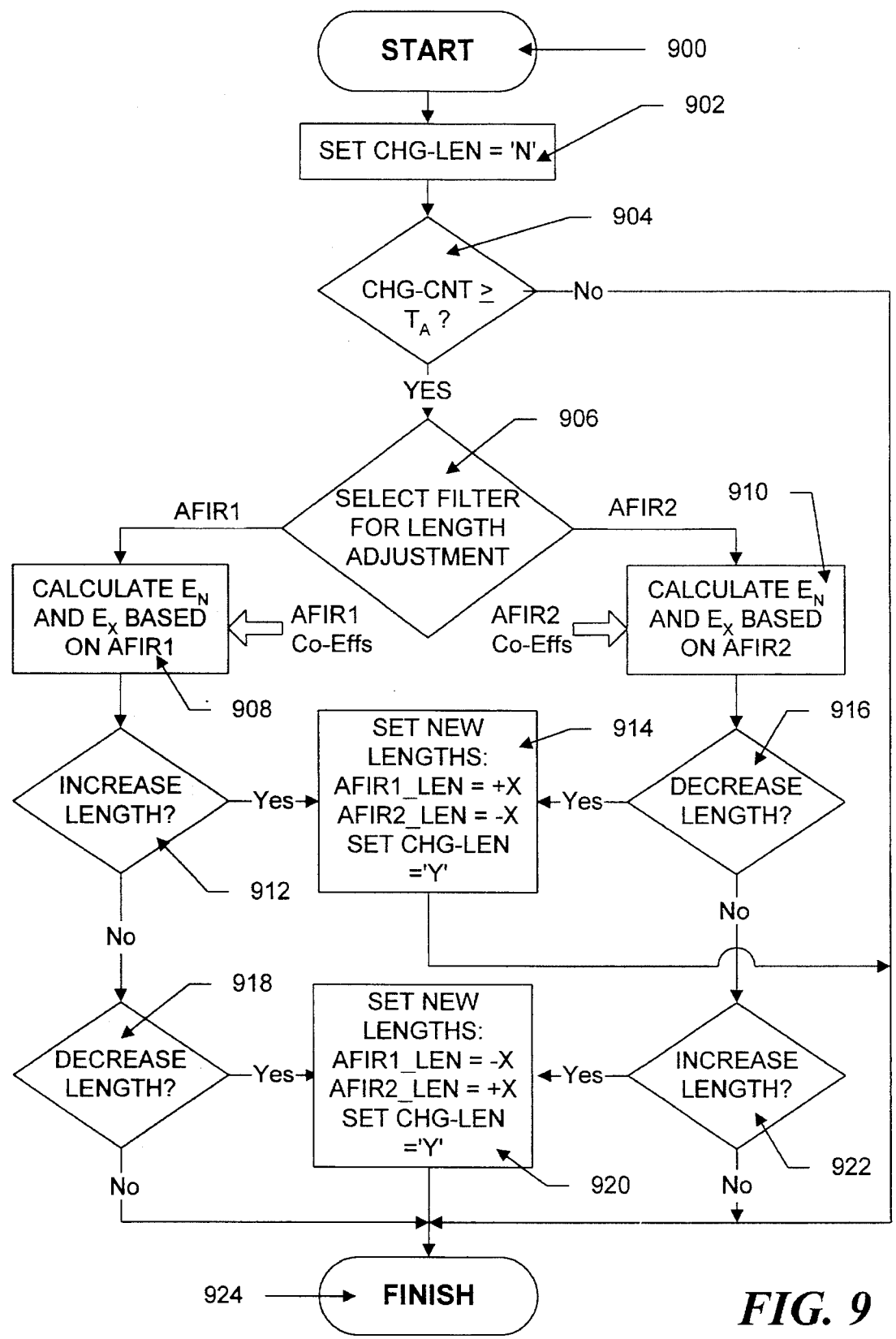
FIG. 9 is a flow chart which illustrates the process of determining filter lengths for a two-filter application in accordance with another embodiment of the present invention.

The flowchart of FIG. 9 illustrates, in detail, an illustrative example of "off-line" code used to set the filter length for a two-filter ALAFIR. It is illustratively assumed that the filter lengths for filters AFIR1 and AFIR2 are changed dependently, that is, as one filter is increased in length, the other is decreased by the same amount. The illustrated process begins at step 900 and proceeds to step 902, where the Chg-Len flag is reset to indicate that the filter lengths should not be changed. Next, at step 904, the routine determines whether a sufficient time interval has elapsed since the previous filter-length adaptation to let the coefficients converge to their steady-state value. This latter determination is made by comparing the Chg-Cnt variable value to the adjustment delay value $T_A$, as previously discussed. If the coefficients have not had time to converge, the program proceeds to step 924 and completes this "off-line" segment of the program.

If, on the other hand, the coefficients have had time to converge, the program proceeds from step 904 to step 906 where one of the two filters is selected for length adjustment. If AFIR1 is selected, the program proceeds to step 908 where the coefficient energy is computed for all of the AFIR1 tap coefficients as explained in relation to FIG. 8 at steps 806 and 808.

At step 912, the routine determines whether the length of the AFIR1 filter should be increased, based on whether the energy of the last "X" coefficients is greater than or equal to 10% of the energy of all the coefficients in a manner similar to that discussed in connection with steps 812 and 810 of FIG. 8. If, in step 912, a determination is made that the length should be increased, the routine proceeds to step 914, where variables AFIR1_len and AFIR2_len indicating the lengths of filters AFIR1 and AFIR2, respectively are adjusted. This adjustment is performed by increasing the length of filter AFIR1 (AFIR1_len) by X taps as indicated schematically in step 914 and decreasing the length of filter AFIR2 (AFIR2_len) by the same X taps. The Chg-Len flag is then set to cause the filter lengths to be reset. The routine then proceeds to finish in step 924.

If the length of filter AFIR1 need not be increased as determined in step 912, the routine proceeds to step 91 8 where it determines, based on whether the computed coefficient energy of the last "X" coefficients is less than 5% of the energy of all the coefficients, whether the length of the filter AFIR1 should be decreased. Again, this determination is made as outlined in steps 816 and 814 of FIG. 8. Returning to FIG. 9, if the length should be decreased, the routine proceeds to step 920 where the new lengths for filters AFIR1 and AFIR2, with the length of filter AFIR1 (AFIR1_len) decreasing by the same X taps that the length of filter AFIR2 (AFIR2_len) increases. The routine then progresses to step 924, the end of the routine. Alternatively, if the length of filter AFIR1 is not to be altered at step 918, the program proceeds to step 924, the end of the routine.

If, at step 906, filter AFIR2 is chosen, the program proceeds in analogous fashion calculating the energies for AFIR2 at step 910, determining if the length of AFIR2 should be shortened at step 916, and determining whether the length of AFIR2 should be increased at step 922.

Although FIG. 9 illustrates a routine for dependently adjusting the lengths of filters AFIR1 and AFIR2, each of the filters could also be adapted independently using the process illustrated by the flowchart of FIG. 8 and changing the filter lengths by independent amounts. Complementary length adjustment uses less code but the independent adaptation approach may produce higher quality output signals. The filter memory allocation may be prioritized before filter length adaptation so that, if both filters contend for limited memory, one filter will be allocated memory space in spite of the other's request. The prioritization may be made on a variety of criteria and it may be changed according to changing filter demands.

An ALAFIR-based echo-canceler may be implemented, for example, using a digital signal processing integrated circuit such as the DSP2105 manufactured and distributed by Analog Devices Corporation, Norwood, Mass. to effect the signal processing functions. This signal processing may be implemented according to the flow charts and figures set forth in this disclosure and might include filter-length adaptation in addition to basic AFIR implementation and operation. Illustratively, an ITT ASC02300 dual channel codec may be used to convert the analog signals used on the telephone line, the input microphone, and the output amplifier to and from 16-bit digital data samples used in the ALAFIR circuit.

Thus, it will be seen that we have provided a description of an invention which adapts the length of AFIR filters to enhance the performance of such filters. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. An apparatus for canceling acoustic and electrical echoes in a digitized audio signal, the apparatus comprising:

a digital filter for generating an output signal, the digital filter having a plurality of sequential sections, wherein each of the sections generates a section signal which contributes to the output signal; and adjustment apparatus responsive to an adjustment value determined using at least a first section signal generated by at least one of the plurality of sections, the adjustment apparatus modifying the length of the filter by changing the total number of said plurality of sections in the digital filter in response to a difference between the adjustment value and a threshold value, the adjustment apparatus modifying the filter length repeatedly over time with a minimum temporal separation between each modification that is dependent on a convergence constant of the filter.

2. An echo canceling apparatus according to claim 1 wherein the digital filter is an adaptive finite-impulse-response filter.

3. An echo canceling apparatus according to claim 1 wherein the first section signal is generated by multiplying a section output by a coefficient value.

4. An echo canceling apparatus according to claim 3 wherein the adjustment apparatus comprises means responsive to the absolute value of the coefficient value for generating the threshold value.

5. An echo canceling apparatus according to claim 3 wherein the adjustment apparatus comprises means responsive to the squared value of the coefficient value for generating the threshold value.

6. An echo canceling apparatus according to claim 3 wherein the adjustment apparatus comprises means responsive to the root mean square value of the coefficient value for generating the threshold value.

7. An apparatus for canceling acoustic and electrical echoes in a digitized audio signal which includes a desired input signal plus echoes, the apparatus comprising:

a digital finite-impulse-response filter having a tapped delay line with a plurality of tap outputs, a plurality of multipliers, one of the plurality of multipliers connected to each tap output for generating a partial output equal to the each tap output multiplied by a variable coefficient value, a summer for summing all of the partial outputs to generate an output signal and means for adjusting the coefficient values to minimize a difference between the filter output signal and the desired input signal;

apparatus for applying the digitized audio signal to the tapped delay line; and apparatus responsive to a predetermined number of the partial outputs for disconnecting the predetermined number of partial outputs from the summer when the partial outputs fall below a threshold value.

8. An echo canceling apparatus according to claim 7 wherein the disconnecting apparatus comprises:

apparatus for computing the average energy of a predetermined number of coefficients corresponding to the predetermined number of partial outputs; and apparatus for disconnecting the predetermined number of partial outputs when the average energy of the predetermined number of coefficients falls below a first predetermined threshold.

9. An echo canceling apparatus according to claim 8 further comprising apparatus for reconnecting the predetermined number of partial outputs when the average energy of the predetermined number of coefficients rises above a second predetermined threshold.

10. An echo canceling apparatus according to claim 9 further comprising apparatus for computing an average energy of all of the plurality of coefficients and apparatus for computing the first predetermined threshold and the second predetermined threshold from the average energy of all of the plurality of coefficients.

11. An echo canceling apparatus according to claim 7 wherein the disconnecting apparatus comprises:

apparatus for computing the average root mean square value of a predetermined number of coefficients corresponding to the predetermined number of partial outputs; and apparatus for disconnecting the predetermined number of partial outputs when the average root mean square value of the predetermined number of coefficients falls below a first predetermined threshold.

12. An echo canceling apparatus according to claim 11 further comprising apparatus for reconnecting the predetermined number of partial outputs when the average root mean square value of the predetermined number of coefficients rises above a second predetermined threshold.

13. An echo canceling apparatus according to claim 12 further comprising apparatus for computing an average root mean square value of all of the plurality of coefficients and apparatus for computing the first predetermined threshold and the second predetermined threshold from the average root mean square value of all of the plurality of coefficients.

14. An echo canceling apparatus according to claim 7 wherein the disconnecting apparatus comprises:

apparatus for computing the average absolute value of a predetermined number of coefficients corresponding to the predetermined number of partial outputs; and apparatus for disconnecting the predetermined number of partial outputs when the average absolute value of the predetermined number of coefficients falls below a first predetermined threshold.

15. An echo canceling apparatus according to claim 14 further comprising apparatus for reconnecting the predetermined number of partial outputs when the average absolute value of the predetermined number of coefficients rises above a second predetermined threshold.

16. An echo canceling apparatus according to claim 15 further comprising apparatus for computing an average absolute value of all of the plurality of coefficients and apparatus for computing the first predetermined threshold and the second predetermined threshold from the average absolute value of all of the plurality of coefficients.

17. An echo canceling apparatus according to claim 7 wherein the disconnecting apparatus disconnects the predetermined number of partial outputs from the summer by setting coefficient values corresponding to the predetermined number of partial outputs to zero.

18. A speakerphone apparatus for processing a digitized audio input signal which includes a desired input signal plus acoustic echoes and for processing a digitized audio output signal which includes a desired output signal plus electrical echoes, the speakerphone apparatus comprising:

a first digital finite-impulse-response filter for canceling the acoustic echoes having a first tapped delay line with a first plurality of tap outputs, a first plurality of multipliers, one of the first plurality of multipliers connected to each of the first plurality of tap outputs for generating a first partial output equal to the each of the first plurality of tap outputs multiplied by one of a first plurality of variable coefficient values, a first summer for summing all of the first partial outputs to generate a first output signal and a first mechanism for adjusting the first plurality of coefficient values to minimize a difference between the first filter output signal and the desired input signal;

first apparatus responsive to a first predetermined number of the first filter partial outputs for disconnecting the first predetermined number of partial outputs from the first summer when the partial outputs fall below a first threshold value;

a second digital finite-impulse-response filter for canceling the electrical echoes having a second tapped delay line with a second plurality of tap outputs, a second plurality of multipliers, one of the second plurality of multipliers connected to each of the second plurality of tap outputs for generating a second partial output equal to the each of the second plurality of tap outputs multiplied by one of a second plurality of variable coefficient values, a summer for summing all of the second partial outputs to generate a second output signal and a second mechanism for adjusting the second plurality of coefficient values to minimize a difference between the second filter output signal and the desired output signal;

second apparatus responsive to a second predetermined number of the partial outputs for disconnecting the second predetermined number of partial outputs from the second summer when the second partial outputs fall below a second threshold value.

19. A speakerphone apparatus according to claim 18 further comprising apparatus for reconnecting the first predetermined number of first partial outputs when the first partial outputs rise above a third predetermined threshold.

20. A speakerphone apparatus according to claim 19 further comprising apparatus for reconnecting the second predetermined number of second partial outputs when the second partial outputs rise above a fourth predetermined threshold.

21. A speakerphone apparatus according to claim 20 wherein a sum of a number of first partial outputs in the first filter which are connected to the first summer and a number of second partial outputs in the second filter which are connected to the second summer remains constant over the operation of the speakerphone.

22. A speakerphone apparatus according to claim 21 wherein the first digital filter and the second digital filter are implemented in digital signal processors.

23. A method for canceling acoustic and electrical echoes in a digitized audio signal which includes a desired input signal plus echoes, the method comprising the steps of:

A. applying the digitized audio signal to a digital finite-impulse-response filter having a tapped delay line with a plurality of tap outputs, a plurality of multipliers, one of the plurality of multipliers connected to each tap output for generating a partial output equal to the each tap output multiplied by a variable coefficient value, a summer for summing all of the partial outputs to generate an output signal and a mechanism for adjusting the coefficient values to minimize a difference between the filter output signal and the desired input signal;

B. monitoring the outputs from a predetermined number of partial outputs; and

C. disconnecting the predetermined number of partial outputs from the summer when the predetermined number of partial outputs fall below a threshold value.

24. A method for canceling echoes according to claim 23 wherein step C comprises the steps of:

C1. computing the average energy of a predetermined number of coefficients corresponding to the predetermined number of partial outputs; and C2. disconnecting the predetermined number of partial outputs when the average energy of the predetermined number of coefficients falls below a first predetermined threshold.

25. A method for canceling echoes according to claim 24 further comprising the step of:

D. reconnecting the predetermined number of partial outputs when the average energy of the predetermined number of coefficients rises above a second predetermined threshold.

26. A method for canceling echoes according to claim 25 further comprising the steps of:

E. computing an average energy of all of the plurality of coefficients; and

F. computing the first predetermined threshold and the second predetermined threshold from the average energy of all of the plurality of coefficients computed in step E.

27. A method for canceling echoes according to claim 23 wherein step C comprises the steps of:

C3. computing the average root mean square value of a predetermined number of coefficients corresponding to the predetermined number of partial outputs; and C4. disconnecting the predetermined number of partial outputs when the average root mean square value of the predetermined number of coefficients falls below a first predetermined threshold.

28. A method for canceling echoes according to claim 27 further comprising the step of:

G. reconnecting the predetermined number of partial outputs when the average root mean square value of the predetermined number of coefficients rises above a second predetermined threshold.

29. A method for canceling echoes according to claim 28 further comprising the steps of:

H. computing an average root mean square value of all of the plurality of coefficients; and I. computing the first predetermined threshold and the second predetermined threshold from the average root mean square value of all of the plurality of coefficients.

30. A method for canceling echoes according to claim 23 wherein step C comprises the steps of: the disconnecting apparatus comprises:

C5. computing the average absolute value of a predetermined number of coefficients corresponding to the predetermined number of partial outputs; and C6. disconnecting the predetermined number of partial outputs when the average absolute value of the predetermined number of coefficients falls below a first predetermined threshold.

31. A method for canceling echoes according to claim 30 further comprising the step of:

J. reconnecting the predetermined number of partial outputs when the average absolute value of the predetermined number of coefficients rises above a second predetermined threshold.

32. A method for canceling echoes according to claim 31 further comprising the steps of:

K. computing an average absolute value of all of the plurality of coefficients; and L. computing the first predetermined threshold and the second predetermined threshold from the average absolute value of all of the plurality of coefficients.

33. A method for canceling echoes according to claim 32 wherein step C comprises the step of:

C7. disconnecting the predetermined number of partial outputs from the summer by setting coefficient values corresponding to the predetermined number of partial outputs to zero.

34. An echo canceling apparatus according to claim 3 further comprising:

a memory device having a plurality of addressable memory locations for storing said coefficient values and said section signal values; and a dynamic memory allocation mechanism for allocating and unallocating portions of said plurality of addressable memory locations in response to the number of said plurality of sections.

35. An echo canceling apparatus according to claim 1 wherein the adjustment apparatus comprises means for adding additional sequential sections to said digital filter when the adjustment value exceeds a second signal value.

36. An echo canceling apparatus according to claim 35 further comprising a digital signal processor integrated circuit wherein said digital filter is contained within said digital signal processor.

37. An echo canceling apparatus according to claim 9 further comprising a digital signal processor wherein said digital finite-impulse response filter is contained within said digital signal processor.

38. An echo canceling apparatus according to claim 9 furthering comprising:

a memory device having a plurality of addressable memory locations for storing said variable coefficient values and said partial output values; and a dynamic memory allocation mechanism for allocating and unallocating portions of said plurality of addressable memory locations in response to the number of said partial outputs connected to said summer.

39. A speakerphone apparatus according to claim 20 furthering comprising:

a memory device having a plurality of addressable memory locations for storing said first and second plurality of coefficient values and said first and second plurality of partial output values; and a dynamic memory allocation mechanism for allocating and unallocating portions of said plurality of addressable memory locations in response to both the number of said first partial outputs connected to said first summer and the number of said second partial outputs connected to said second summer.

40. A method of canceling echoes according to claim 25 further comprising the step of allocating and unallocating addressable memory locations in a memory device in response to the number of the partial output signals input to the summer.

* * * * *

UNITED STATES PATENT AND TRADEMARK OFFICE
CERTIFICATE OF CORRECTION

PATENT NO. : 5,473,686
DATED : December 5, 1995
INVENTOR(S) : Virdee

It is certified that error appears in the above-indentified patent and that said Letters Patent is hereby corrected as shown below:

Column 13, line 44, after "filter" and before "for" should read --responsive to the digitized audio input signal--.

Column 13, line 62, after "filter" and before "for" should read --responsive to the digitized audio output signal--.

Column 14, line 9, after "signal;" should read --and--.

Signed and Sealed this

Ninth Day of July, 1996

Attest:

BRUCE LEHMAN

*Attesting Officer*     Commissioner of Patents and Trademarks